United States Patent [19]
Slator et al.

[11] 3,866,954
[45] Feb. 18, 1975

[54] JOINT LOCKING DEVICE
[75] Inventors: Damon T. Slator; Archie W. Peil, both of Houston, Tex.
[73] Assignee: Bowen Tools, Inc., Houston, Tex.
[22] Filed: June 18, 1973
[21] Appl. No.: 370,811

[52] U.S. Cl.................. 285/82, 285/91, 285/333
[51] Int. Cl............................................. F16l 35/00
[58] Field of Search............ 285/81, 82, 84, 85, 90, 285/91, 92, 333, 334, 421

[56] References Cited
UNITED STATES PATENTS
2,839,315  6/1958   Arterbury et al.................. 285/91
3,284,105  11/1966  Levtwyler........................ 285/81
3,302,960  2/1967   Herrmann........................ 285/81
3,445,126  5/1969   Watkins.......................... 285/85

Primary Examiner—Patrick D. Lawson

[57] ABSTRACT

A positive joint locking device for locking a threaded joint of pipe or the like against disengagement including split housing sections releasably mounted about a threaded joint; gripper means and wedge means being mounted with said housing sections for grippingly engaging the pipe joint with greater forces of resistance to disengagement in response to the exertion of greater disengagement forces.

10 Claims, 2 Drawing Figures

PATENTED FEB 18 1975 3,866,954

JOINT LOCKING DEVICE

BACKGROUND OF THE INVENTION

This invention relates to the field of positive joint lock devices.

There are various situations wherein it is desirable to lock a threaded joint, formed by the threaded connection of two pipe ends, to prevent the loosening or unscrewing of the joined pipe ends even when large disengagement forces are applied.

SUMMARY OF THE INVENTION

It is an object of this invention to provide a new and improved positive joint locking device for preventing the threaded disengagement of threaded joints even when relatively large disengagement forces or torques are applied.

It is a further object of this invention to provide such a new and improved positive locking device with means for gripping the ends of a threaded joint with even greater forces of resistance against loosening of the joint in response to the application of greater loosening or disengagement forces.

These objects are accomplished by providing a new and improved positive joint locking device for locking a threaded joint of pipe or the like against threaded disengagement. The positive joint locking device of this invention includes split housing sections which are releasably mounted about a threaded joint; a combination of gripper means and wedge means are mounted with the split housing sections for grippingly engaging the joint to prevent threaded disengagement thereof. The gripper means and wedge means of the joint locking device of this invention further cooperate to grippingly lock the joint against disengagement with greater force of resistance in response to the exertion of greater disengagement forces. Thus, the locking action of the gripper means is increased in effectiveness even as the forces tending to threadedly disengage the joint increase.

The gripper means of this invention includes gripper elements which are mounted within recesses in the housing sections and the wedge means includes wedge members positioned within the recesses in engagement with the gripper elements whereby the gripper elements are moved radially inwardly into greater gripping engagement with the threaded joint in response to the exertion of joint disengagement forces.

DESCRIPTION OF THE PREFERRED EMBODIMENT

Figure 1:
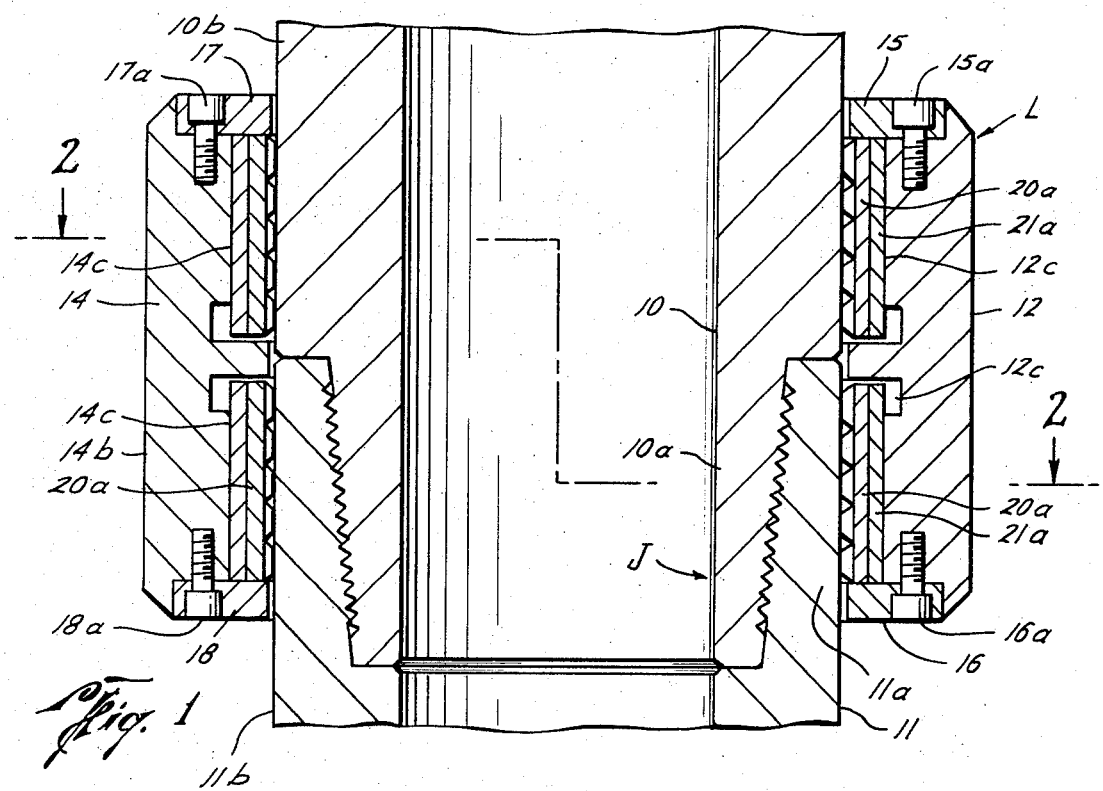
FIG. 1 is a cross-sectional view taken along line 2—2 of FIG. 2 illustrating the positive joint locking device of this invention in position about a threaded joint.

Referring to the drawings, the letter L generally designates a positive joint locking device for positively locking a threaded joint J against disengagement. The threaded joint J represents the threaded connection between pipe or other tubular members 10 and 11. In the embodiment of the invention herein shown, the pipe member 10 includes a threaded male end portion 10a and the pipe member 11 includes a threaded female member end portion 11a. The male and female end portions 10a and 11a, respectively, are threadedly connected as shown to form the joint J. It is the object of this invention to provide the positive locking device L for mounting about the joint J to prevent unloosening, unscrewing and threaded disengagement of the pipe member male end portion 10a from the pipe member female end portion 11a.

Figure 2:
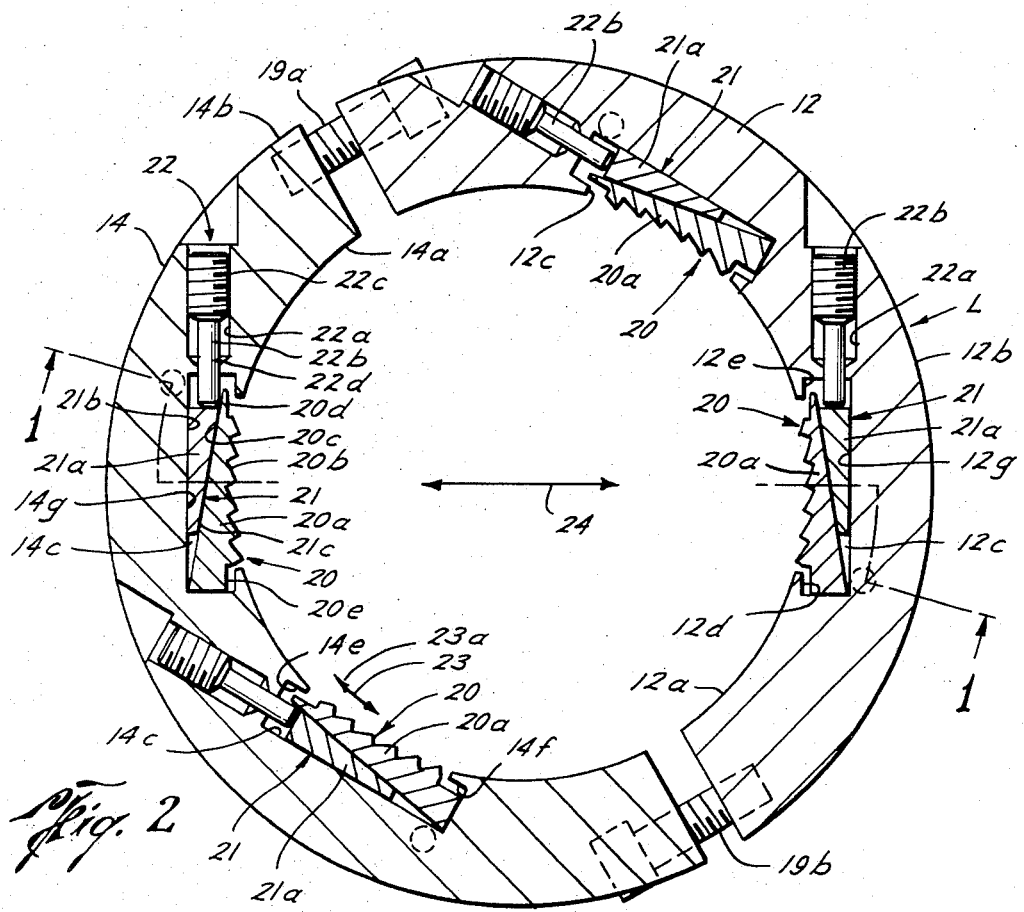
FIG. 2 is a cross-sectional view taken along line 2—2 of FIG. 1 further illustrating the locking action of the positive joint locking device.

The locking device L includes two semi-cylindrical split housing sections 12 and 14 which are adapted for mounting about the pipe ends 10a and 11a of the joint J. The split housing section 12 includes an inner concave surface 12a having a radius of curvature substantially similar to the curvature of the outside walls 10b and 11b of pipe ends 10a and 11a, respectively. The split housing section 12 further includes an outer convex surface 12b. The split housing section 12 has four recesses or openings 12c positioned therein. The recesses 12c open to the outside pipe walls 10b and 11b. Referring to FIGS. 1 and 2, it is noted that the recesses 12c in the split housing section 12 are positioned such that two of the recesses open against outside pipe wall 10b and two of the recesses 12c open to the outer pipe wall 11b.

The split housing section 14 is basically identical in structure to the split housing section 12 but is adapted to be mounted opposite to the split housing section 12 such that the split housing sections 12 and 14 cooperate to enclose the entire joint J. The split housing section 14 thus includes an inner concave surface 14a having a radius of curvature substantially equal to the curvature of the outside pipe walls 10b and 11b. The outer surface 14b of the split housing section 14 is convex in configuration such that a semi-cylindrical housing section is formed, as particularly viewed in FIG. 2. The split housing section 14 further includes four recesses 14c which are machined in the housing section 14 such that the recesses open against the outside pipe walls 10b and 11b when the split housing section 14 is positioned thereagainst. The housing recesses 14c are positioned such that two of the recesses are exposed to the male pipe end 10a and two of the recesses 14c are exposed to the female pipe end 11a of the joint J.

Referring to FIG. 1, the upper recesses 12c are enclosed at the top thereof by a cap 15 which is mounted and held in position by screws such as 15a. Similarly, the lower recesses 12c illustrated in FIG. 1 for the split housing section 12 include a cap member 16 mounted by means of screw members such as 16a. Similarly, upper cap members 17 are mounted by screw members 17a onto the housing section 14 to serve as a top or cap to the upper recesses 14c illustrated in FIG. 1 and lower cap members 18 held in position by screws 18a serve as the containing bottom to the lower recesses 14c.

The split housing sections 12 and 14 are mounted about the pipe ends 10a and 11a and are releasably held in position thereabout by bolts such as 19a and 19b. The bolts 19a and 19b are counter-sunk into housing section 12 and are threadedly connected to housing sections 14 such that the housing section can be connected and removed as desired. Whenever it is desired to remove the split housing sections of the locking device L from the pipe ends 10a and 11a forming the joint J, the bolt members 19a and 19b are simply unscrewed from the threaded engagement with the housing sections 14 and 12.

Gripper means generally designated as 20 are mounted in each of the recesses 12c and 14c in the split housing sections 12 and 14, respectively, in order to grippingly engage the pipe ends 10a and 11a forming the joint cap J to prevent unscrewing or other threaded disengagement of the pipe members 10 and 11. Further, wedge means generally designated as 21 are mounted in the housing recesses 12c and 14c in order to wedge the gripper means 20 into greater gripping engagement with the pipe ends 10a and 11a in response to the exertion of greater forces tending towards the unloosening or disengagement of the pipe ends. Adjustment means generally designated as 22 are mounted in each of the housing sections 12 and 14 in engagement with the wedge means 21 in order to adjust the radial position of the gripper means 20 whereby the locking device L may be mounted about the pipe ends 10a and 11a of various diameters.

Each of the gripper means 20 mounted in each of the housing recesses 12c and 14c are identical in structure and thus like letters and numbers are used to describe like parts. Each of the gripper means 20 includes a gripper element 20a having an inner substantially convex surface 20b with a number of gripper teeth protruding therefrom in order to grip the outside walls 10b and 11b of the pipe ends 10a and 11a. The gripper element 20a is tapered when viewed in cross-section as in FIG. 2 such that outside surface 20c is tapered. The gripper element 20a includes end shoulder portions 20d and 20e adapted to engage corresponding shoulders 14e and 14f of the recesses 14c of housing section 14. The tapered cross-sectional shape of the gripper elements 20a and the flat shoulder end portions 20d and 20e mount the gripper element 20a for movement both laterally or circumferentially in the directions illustrated by arrow 23 and radially toward and away from the outside pipe walls 10b and 11b in the directions illustrated by arrow 24.

The gripper elements 20a mounted in the housing recesses 12c are mounted for both lateral and radial movement in a manner similar to the mounting of the gripper elements 20a in the housing recesses 14c. Thus the housing recesses 12c include retaining shoulders 12d and 12e which contain the gripper elements 20a within the recess 12c.

The wedge means 21 include tapered wedge members 21a which are mounted within the housing recesses 14c to control the radial position of the gripper elements 20a. The outer surface 21b of each wedge member 21a is adapted to mount the wedge member 21a for slidable movement along the back wall 14d of the recess 14c. The gripper element 21a includes an inside, tapered wall 21c which is adapted to slidably engage the outside tapered wall 20c of the gripper element 20a. In this manner, the gripper element 20a continually, slidably engages the inside, tapered wall 21c of the wedge member 21 such that the radial position of the gripper element 20a is dependent upon the position of the wedge member 21a. Thus, as the gripper element 20a is moved laterally in the directions illustrated by the arrow 23 by forces acting laterally (circumferentially) against the gripper element, the gripper element 20a is moved radially inwardly or outwardly with respect to the outside pipe walls 10b and 11b. These lateral forces exerted by pipe ends 10a and 10b are, of course, the result of joint disengagement forces being applied.

Similarly, the wedge members 21a mounted in the housing recesses 12c are mounted for slidable movement with respect to recess backwall 12g and control the radial position of the gripper elements 20a mounted in the housing recesses 12c.

The position of the wedge members 21a in the recesses 12c and 14c determines the radial position of the gripper elements 21a therein. Thus, the initial radial position of each of the gripper elements 20a can be adjusted by adjusting the position of the wedge members 21a within their respective housing recesses 12c or 14c. The adjustment means generally designated as 22 provide for adjustment of the radial position of each of the gripper elements 20a by adjusting the position of the wedge members 21a in their respective housing recesses. Each of the adjustment means 22 is provided by openings 22a in the housing sections 12 and 14. Each of the openings 22a extends from the outer walls, 12b and 14b of the respective housing sections into each of the recesses 12c and 14c therein. The openings 22a include threaded portions which are adapted to threadedly receive and engage adjustor screw members 22b. The adjustor screw members 22b include threaded portions 22c adapted to threadedly engage the threaded portions in the opening 22a and further include protruding end portions 22d which extend into the recesses 12c and 14c in order to engage the wedge members 21a. Thus, by threadedly adjusting the position of the adjustor screw members 22b within the openings 22a in the housing sections 12 and 14, the lateral position of the wedge member 21a within the recesses 12c and 14c may be controlled, thereby controlling the initial, radial position of the gripper elements 20a.

The locking device L of the preferred embodiment of this invention is operated and used in the following manner. The split housing sections 12 and 14 are positioned about the outside walls 10b and 11b of the pipe joint J. The housing sections 12 and 14 are then bolted together by means of connecting bolts 19a and 19b such that the concave, inside housing section walls 12a and 14a are in engagement with the outside pipe walls 10b and 11b.

Due to the threaded connection formed by the connector bolts 19a and 19b, it is noted that the position of the split housing sections 12 and 14 can be adjusted for mounting about pipe ends of various diameters.

The housing sections 12 and 14 are positioned with respect to the pipe members 10 and 11 such that two of the housing section recesses 12c and two of the housing section recesses 14c are positioned substantially adjacent to the outside wall 10b of the pipe member 10. In this position, two of the housing recesses 14c and two of the housing recesses 12c are positioned substantially adjacent to the outside wall 11b of the pipe member 11. In this manner, four of the gripper means 20 are positioned to engage the outside wall 10b of the pipe member 10 and four of the gripper means 20 are positioned to engage the outside wall 11b of the pipe member 11.

After the split housing sections 12 and 14 are firmly mounted about the pipe ends 10a and 11a forming the pipe joint J, the gripper elements 20a are radially positioned against the outside pipe walls 10b and 11b. The radial positioning of the gripper elements 20a is accomplished by threadedly adjusting the position of the adjustor screws 22c. Thus, the position of the adjustor screws 22b is adjusted thereby adjusting the lateral position of the wedge members 21a in the recesses 12c and 14c, which in turn adjusts the radial position of the gripper elements 20a with respect to the outside pipe walls 10b and 11b. The adjustor screws 22b thus initially position the gripper elements 20a in sufficient engagement with the outside pipe walls 10b and 11b that any rotation of either of the pipe members 10 and 11 in a direction tending towards the disengagement of the threaded connection therebetween will cause lateral and thus radial movement of the gripper elements 20a inwardly.

The locking device L of the preferred embodiment of this invention acts to prevent threaded disengagement of the joint cap J in the following manner. Whenever unloosening or disengagement forces or torques are applied against either of the pipe members 10 and 11, the gripper elements 20a, which are in engagement with the outside pipe walls 10b and 11b, serve to grippingly engage the outside wall 10b and 11b and prevent relative rotation between the male pipe end 10a and the female pipe end 11a. Further, whenever the unloosening or disengagement forces are so great that there is some relative rotation between the pipe ends 10a and 11a, the gripper elements 20a which engage the pipe member that is moving are moved laterally and radially inwardly (due to the wedging actions of wedge members 21a) into greater engagement with the outside wall of the pipe member that is moved. Therefore, the application of a greater disengagement force to one of the pipe members such as the pipe member 11, will cause the gripper elements 21a which are in gripping engagement with the outside wall 11b to move radially inwardly into greater resistive engagement with the outside pipe wall 11b thereby resisting further movement or disengagement of the pipe member 11. That is, the gripping engagement preventing unlocking of the pipe joint J that is exerted by the gripper elements 20a is proportional to the amount of disengagement torque or force applied against the pipe member and is further proportional to the amount of unloosening rotation of the pipe member which actually takes place.

Referring again in particular to FIG. 2, if a gripper element 20a is caused to be moved laterally in the direction of arrow 23a, the wedge member 21a, and in particular the inside wedging surface 21c, will cause the gripper element 20a to be moved not only laterally in the direction of arrow 23, but also radially inwardly into further and greater gripping engagement with the outside wall of the pipe member which is moving. The gripper element 20a that is caused to move in the direction of arrow 23a moves radially inwardly due to the wedging action of the wedge member 21a as the gripper element 20a slides along the inside wedging surface 21c of the wedge member 21a.

Among the features of this invention is the adjustability of the housing sections 12 and 14 with respect to each other and further the adjustability of the individual gripper elements 20a with respect to the outside walls of the pipe members 10 and 11. Thus the locking device L of the preferred embodiment of this invention can be mounted about a pipe joint J wherein each of the pipe members 10 and 11 forming the joint have different diameters with respect to each other.

It is noted that the mounting of the gripper elements 20a and the wedge members 21a into the recesses 12c and 14c is accomplished very simply by utilizing the caps 15, 16, 17 and 18. The caps such as 15 further allow the gripper elements 20a and the wedge members 21a to be easily removed whenever desired.

The foregoing disclosure and description of the invention are illustrative and explanatory thereof, and various changes in the size, shape, and materials as well as in the details of the illustrated construction may be made without departing from the spirit of the invention.

We claim:

1. A positive joint locking device for locking a threadedly connected joint of pipe or the like against threaded disengagement, comprising:

split housing sections for forming an annular assembly, each housing section having an inner curved surface for mounting about the ends of threadedly connected pipe or the like;

releasable attaching means for releasably attaching said split housing sections together about said threadedly connected pipe ends;

gripper means mounted with said split housing sections at the inner surface thereof for gripping said threadedly connected pipe ends to prevent disengagement of said pipe ends; and wedge means for wedging said gripper means substantially radially inwardly relative to said inner surfaces of said housing sections in response to the exertion of lateral forces on said gripper means tending to move same laterally, which lateral forces are caused by forces tending to disengage said threaded connection between said pipe ends, said wedge means and gripper means cooperating to prevent threaded disengagement of said pipe ends.

2. The structure set forth in claim 1, including:

said housing sections including recesses;

said gripper means including gripper elements positioned in said recesses.

3. The structure set forth in claim 2, wherein said wedge means includes:

wedge members positioned in said housing recesses in engagement with said gripper elements, said wedge members including means for moving said gripper elements radially inwardly in response to such lateral forces.

4. The structure set forth in claim 2, including:

said gripper elements being tapered;

said wedge means includes tapered wedge members that are mounted with said housing recesses in engagement with said gripper elements; and said gripper elements and said wedge members including means for moving said gripper elements radially in response to lateral movement of said gripper elements.

5. The structure set forth in claim 1, including:

adjustment means mounted with said housing sections for adjusting the initial position of said gripper means.

6. The structure set forth in claim 3, including:

screw members;

mount means mounting said screw members in said housing sections in engagement with said wedge member for adjusting the initial position of said wedge members.

7. The structure set forth in claim 4, including:

said wedge members being mounted inside said recesses in said housing sections for lateral movement with respect to said housing sections;

said gripper elements including means mounting said gripper elements for radial and lateral movement in response to lateral movement of said wedge members; and screw members mounted in said housing sections for movement into engagement with said wedge members to control the lateral position of said wedge members and thus the lateral and radial positions of said gripping members.

8. The structure set forth in claim 2, including:

said gripper elements including substantially concave gripping surfaces.

9. The structure set forth in claim 3, including:

said gripper elements being mounted in said recesses for slidable movement with respect to said housing sections;

said wedge members being mounted in said recesses for slidable movement with respect to said housing sections; and said gripper elements and said wedge members being mounted for slidable movement with respect to each other.

10. A positive joint locking device for locking a threaded joint of pipe or the like against threaded disengagement, comprising:

a threaded joint including a male pipe end coupled in threaded engagement with a female pipe end;

split housing sections for mounting about said joint;

releasable mounting means releasably mounting said split housing sections about said joint;

gripper means mounted with said split housing sections for grippingly engaging said joint to prevent threaded disengagement thereof; and wedge means for wedging said gripper means into greater gripping engagement with said joint in response to the exertion of greater rotational disengagement forces on said joint.

* * * * *